Patented Dec. 23, 1952

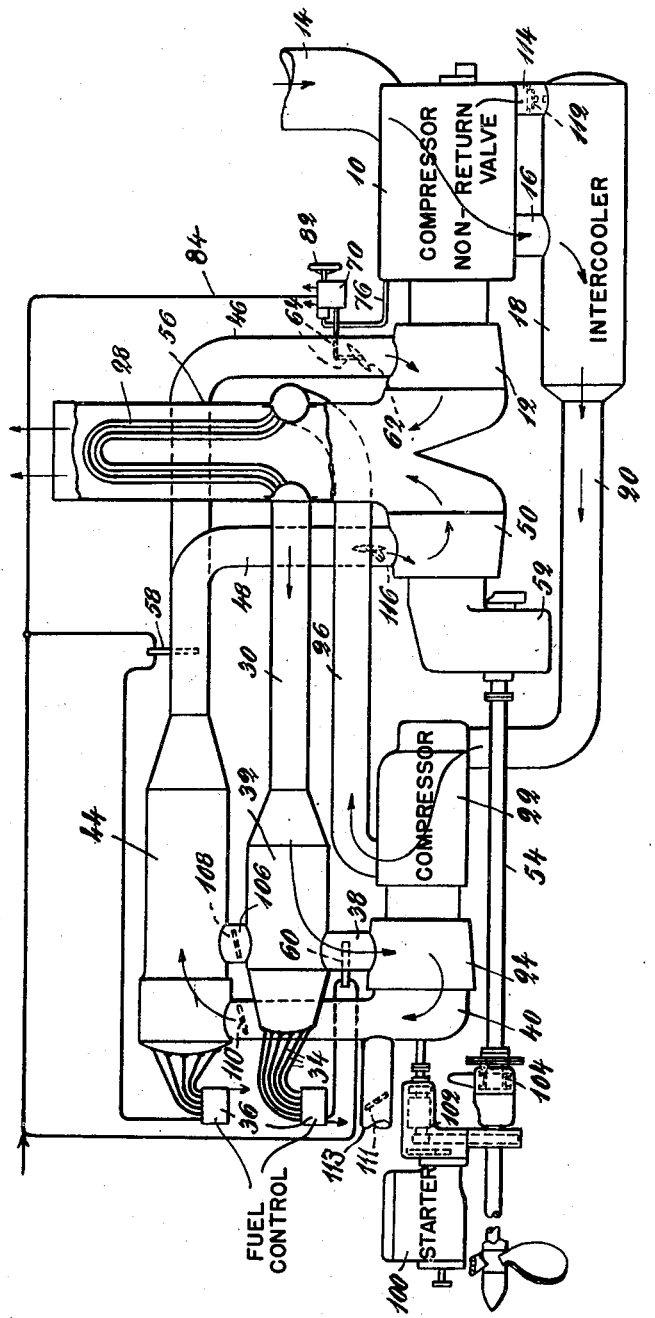

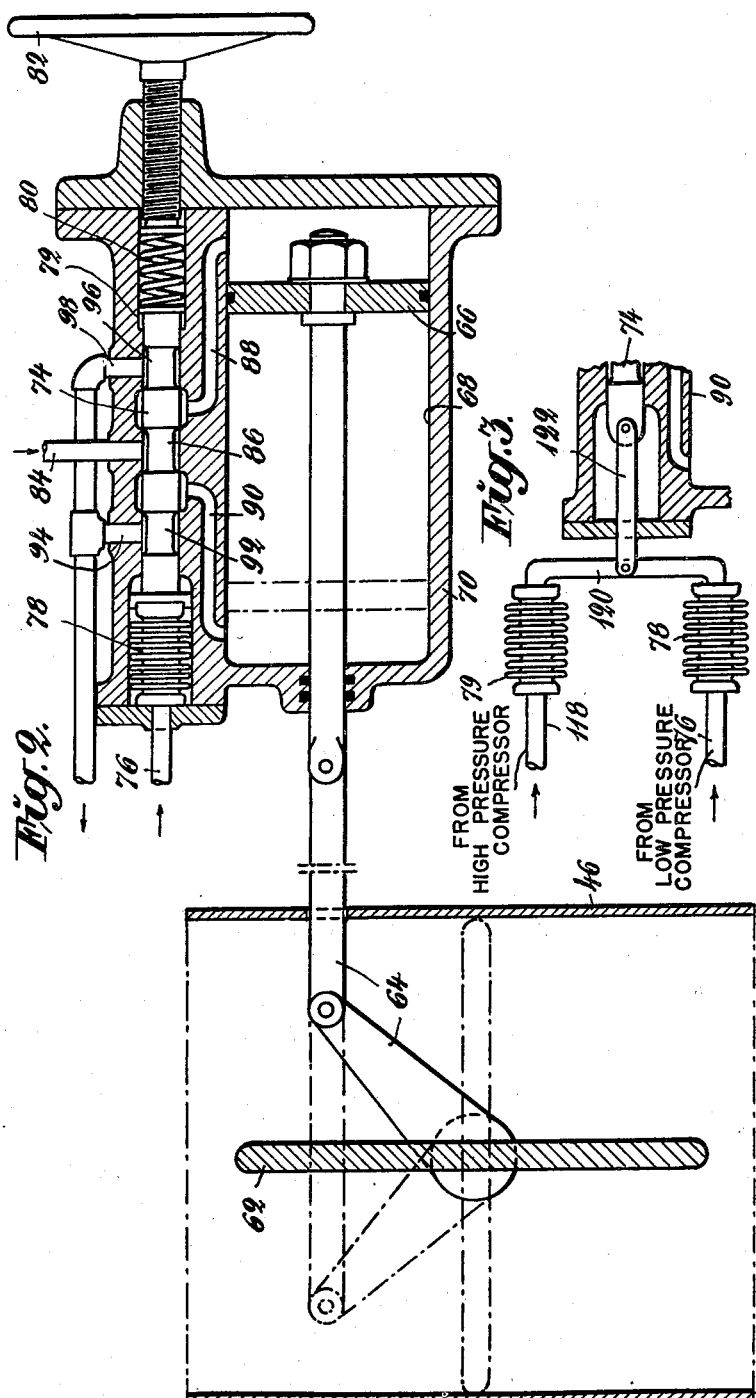

2,622,392

UNITED STATES PATENT OFFICE 2,622,392

CONTROL MEANS FOR VARIABLE LOAD MULTIPLE STAGE GAS TURBINE SYSTEMS

Gustav Karl William Boestad, Lidingo, and Teodor Immanuel Lindhagen, Stockholm, Sweden, assignors, by mesne assignments, to Jarvis C. Marble, Leslie M. Merrill, and Percy H. Batten, as trustees Application September 11, 1944, Serial No. 553,656 In Sweden January 28, 1944

8 Claims. (Cl. 60—39.15)

The present invention relates to gas turbine systems for continuous combustion in at least two steps or stages and comprising high and low pressure turbines. More particularly the invention relates to gas turbine systems of this type having a low pressure turbine which drives a compressor, whereas one or more turbines produce useful power output.

Due to the fact that the available power from the low pressure turbine will at partial load follow approximately the power demanded by the low pressure compressor, it is possible to operate the system at every point of operation at an approximately constant temperature, after a permanent state of operation has been attained, without the use of any throttle control that would entail a marked impairment of the efficiency at partial loads. In this way the efficiency may be kept well at the top over a large range of loads. This method, however, causes certain inconveniences in operation. In order to bring about an increase in the number of revolutions of the compressor and thus of the quantity of air passing through the system, an excess of fuel will have to be injected at every increase of the load, so that a temporary supertemperature is obtained. It should be noted that an increased consumption of air must always accompany an increase of the load. Such temperature peaks invoke a drawback, inasmuch as they strain the turbines and, as a matter of fact, force down the average temperature which can be obtained in front of the same, whereby the average efficiency of the unit is decreased.

Also, it is not always possible to keep the temperature at the highest permissible value in continuous operation at a certain partial load, as the output will not be entirely correctly distributed between the turbines of the system. It may also occur that the temperature in front of some of the turbine part must, at a certain partial load in the permanent state of operation, be adjusted to a lower value than at full load whereas at a further decrease of the load another temperature is required for the proper distribution of the output between the turbines, which temperature is higher than that which is necessary at said higher partial load point. The progress of the temperatures depends in part on the number of revolutions at which the machines must be operated on account of external conditions (such as propeller operation or generator operation). If the requisite temperature follows in the manner set forth along a curve having a minimum value at a certain partial load, then the process of control becomes uncertain within this range, since the partial load is wholly dependent on the temperature and is controlled thereby.

These deficiencies are eliminated by the present invention, the main object of which is to provide a gas turbine system having two low pressure turbines connected in parallel in the operating medium conduits of the system while being mechanically independent of each other, one of said turbines driving the low pressure compressor while the other delivers useful power output, and means adapted to vary the power production of the first-mentioned low pressure turbine relative to the power production of the last-mentioned low pressure turbine. According to the invention, the gas turbine unit may be operated at a thermostat-controlled temperature which can be kept constant at the highest suitable value in normal operation. If the system has one high pressure turbine only, the latter drives the high pressure compressor only. A system of this type can be regulated very economically by means of said means which preferably either comprise a throttle valve in front of the turbine driving the low pressure compressor, or act through a nozzle control of this turbine. When the valve is throttled, or nozzles are cut out, there will be pressure losses in front of the said low pressure turbine, or a change in its efficiency. At the same time, however, the pressure rises in front of the low pressure turbine delivering useful power output and the quantity of motive fluid passing therethrough is increased, whereas the quantity of motive fluid passing through the other turbine is decreased. Thus the throttling is effected on a gas quantity which becomes less and less as the load decreases. It will be seen that when such a partial load has been attained, that the capacity of the high-pressure compressor is sufficient to deliver the required quantity of air, the throttling in front of the low pressure turbine driving the low pressure compressor being no longer of any consequence whatever, since the gas quantity passing through the turbine is then nil.

Further objects and advantages of the invention will be apparent from the following description considered in connection with the accompanying drawings, which form a part of this specification, and of which:

Fig. 1 is a more or less diagrammatic view of a gas turbine system constructed in accordance with the invention.

Fig. 2 shows a detail of the gas turbine system in section and on an enlarged scale, said detail comprising a governor and a cooperating damper in the gas supply conduit of the low pressure turbine adapted to drive the low pressure compressor.

Fig. 3 shows a somewhat modified embodiment of this governor.

In the drawings, 10 designates a low pressure compressor driven by a low pressure turbine 12 and having a fresh-air intake 14 and an outlet 16 for the compressed air. On having passed through a cooler 18 this air is conveyed through a conduit 20 to a high pressure compressor 22 driven by a high pressure turbine 24. The air, which is still further compressed in this compressor, is delivered through a conduit 26, a heat exchanger 28 and a conduit 30 to a high pressure combustion chamber 32. This chamber has a number of fuel nozzles supplied with fuel through conduits 34 from a valve housing 36, the valves of which are actuated by a thermostat-controlled servomotor. The combustion gases flow from the combustion chamber 32 through a conduit 38 to the high pressure turbine 24 and consequently constitute the motive fluid of the latter. On having expanded in the high pressure turbine, the gases flow through a conduit 40 to a low pressure combustion chamber 44 the nozzles of which are supplied with fuel through supply conduits and from a valve housing in the same manner as in the high pressure combustion chamber 32. Extending in parallel from the low pressure combustion chamber 44 are two conduits, one of these 46 extending to the above-mentioned low pressure turbine 12 and the other 48 to a low pressure turbine 50. The latter delivers useful output, in the present case over a gearing 52 to a propeller shaft 54. The gases expanding in the two low pressure turbines escape through a common outlet 56 to the atmosphere, the same being then caused to flow about the heat exchanger 28 arranged in this outlet so as to give off a portion of their heat content to the air flowing in this heat exchanger.

The above-named compressors and turbines may be of any known type known per se, and consequently do not call for any description here in detail. With the aid of a thermostat 58 behind the low pressure combustion chamber 44 and by means of a thermostat 60 in the conduit 38, the above-mentioned servomotor is actuated so that the temperatures of the motive fluid are regulated, prior to the entrance of the latter into the respective turbines, to a constant value which is kept as high as the turbine construction permits. The various turbines, particularly the low pressure turbines 12 and 50, are mechanically independent of each other.

Provided in the conduit 46 is a valve or damper 62 connected through a link system 64 with a plunger 66, which is arranged within a chamber 68 of a housing 70. The housing 70 also has a bore 72 having a slide 74 running therein. The slide 74 bears at its one end on a diaphragm 78 communicating through a conduit 76 with the pressure side of the low pressure compressor 10. At its opposite end, the slide 74 is under the pressure of a spring 80, the tension of which is adjusted from the outside by means of a hand wheel 82 or some other suitable operating device. If the exhaust pressure of the compressor rises above a certain desired value, the diaphragm 78 moves the slide 74 to the right, in Fig. 2, against the action of the spring 80. The result of this is that oil under pressure flows from a conduit 84 about a reduction 86 of the slide and, further, through a passage 88 to the right hand side of the plunger 66, which is thus moved to the left, so that the damper 62 is caused to throttle the flow of motive fluid through the conduit 46. At the same time an outlet has been established in the housing 70 from the left hand side of the plunger 66 by the fact that a passage 90 has been brought into communication with a discharge conduit 94 for the pressure oil over the reduced portion 92 of the slide 74. The exhaust pressure of the low pressure compressor 10 having reassumed the predetermined value, the slide 74 will again take its middle position according to Fig. 2, the movement of the plunger 66 being then caused to cease. Should the air pressure in the compressor 10 fall again, the pressure of the spring 80 will overcome the counter-pressure of the diaphragm 78, the slide 74 then moving to the left from the middle position shown in Fig. 2. Oil under pressure is now supplied through the passage 90 to the chamber 68, by reason of which the plunger 66 will move the valve 62 toward its open position. When the regulator operates in this manner, oil under pressure will escape through the passage 88 and about the reduced portion 96 of the slide 74 to a discharge conduit 98.

The entire control of the gas turbine is effected by adjustment of the valve 62. This valve is preferably kept entirely open at the starting of the system, a starting motor 100 then starting the high pressure turbine 24. As long as the valve 62 is in this position, the system will work up to a higher and higher output and in a certain time reaches its state of full power development. If, however, the valve 62 is moved by means of the hand wheel 82 to a partially throttling position, the low pressure compressor 10 adjusts itself to a lower number of revolutions than that corresponding to full power, the output delivered by the system falling at the same time, inasmuch as the output is, at a constant temperature in front of the turbines, dependent directly on the air quantity. To a definite quantity of air and to a definite output corresponds a definite pressure between the low pressure and high pressure compressors 10 and 22. Therefore, to adjust the system to a certain desired output, the valve or damper 62 is regulated, according to the invention, so that a certain definite pressure adjusts itself in the conduit between the two compressors. This is effected with the aid of the above-described regulating device adapted automatically to keep the said pressure constant for a certain operating position.

If the gas turbine system is to be adjusted to another operating point, the tension of the spring 80 is altered by means of the hand wheel 82. The slide 74 is then displaced and the plunger 66 is actuated in the manner above described, with the result that the valve 62 takes its new position corresponding to this operating point.

The starting motor 100 may be coupled either to the high pressure turbine 24 or to the propeller shaft 54 by means of a gear box 102. In this way, the starting motor may be used to operate a ship at a low rate of speed. At the same time, the gas turbine machinery is then disconnected by means of a free coupling 104 on the propeller shaft. 116 is a quick-action valve for rapid cut-off of the supply of motive fluid to the working turbine 50.

Arranged between the high pressure combustion chamber 32 and the supply conduit to the low pressure turbine 50 delivering useful output is a conduit 106 with a damper 108. By opening this damper and by closing a damper 110 in the conduit 40 between the high pressure turbine 24 and the low pressure turbine 50 and by opening, by means of a valve 111, an outlet through a conduit 113 extending preferably to the discharge conduit 56, the system may also be operated with the low pressure compressor 10 cut out entirely, the damper 62 being then consequently also closed. The high pressure turbine 24 and the low pressure turbine 50 then operate in parallel instead of as otherwise in series. In this way, it is possible to operate a system according to the invention with considerable power, even if the low pressure compressor 10 has to be disconnected entirely. In this type of operation, the air is taken in by opening a non-return valve 112 in a conduit 114 extending from the suction side of this compressor.

The embodiment according to Fig. 3 differs from that disclosed in Fig. 2 substantially only in that the slide 74 is actuated by the pressure behind the high pressure as well as behind the low pressure compressors 22 and 10. These compressors communicate through conduits 76 and 118 each with a diaphragm 78 and 79 respectively, said diaphragms being connected to the slide 74 over a lever 120 and a link 122. Now, if in the course of controlling the low pressure compressor it momentarily operates at a lower number of revolutions than the desired one, while the high pressure compressor has a number of revolutions higher than that corresponding to the operating point for which the damper 62 is adjusted, and the average number of revolutions of the two compressors corresponds approximately to the desired one, the excessive pressure behind the high pressure compressor will, over the diaphragm 79, keep the diaphragm 78 from opening the damper 62 unnecessarily and thus from causing a delay in reaching the state of equilibrium in the process of control. Evidently, other methods of attaining a returning effect on the slide 74 are also conceivable.

The low pressure tubines 12 and 50 may, in difference from the aforesaid, communicate each with a low pressure combustion chamber 44 with fuel supply nozzles for an individual control of the temperature of the flow of motive fluid delivered to the different turbines. The individual control of the temperature also involves that the gas quantities supplied to the turbines are controlled, inasmuch as $$Q = k\sqrt{\frac{p^2}{RT}}$$

wherein $p$ designates the pressure and $T$ the absolute temperature and $R$ the gas constant. The output of the turbine becomes proportional to $Q \times T$ or $= k \times \sqrt{T}$.

An embodiment of this type is obtained, if in Fig. 1 a further chamber 44 is assumed to be located behind the chamber represented therein. Consequently, the conduits 46 and 48 will then each be fed from a chamber 44, said chambers each communicating in turn with the conduit 40 extending from the high pressure turbine 24. In this case it is conceivable to omit the damper 62 with its controlling means. It is advantageous, however, to govern the distribution of the quantities of motive fluid through the two low pressure turbines not only by a change of the temperature but also by simultaneous throttling by means of the valve 62. As a matter of fact, the temperature of the operating medium does not react very rapidly upon a decrease in the quantity of fuel supplied, because the motive fluid may take up a considerable quantity of heat from the hot walls of the combustion chambers and the heat exchangers. The slide 74, or, if desired, any other slide operating in parallel therewith, is then caused to actuate the oil supply to the combustion chambers 44 over the valve housing 36. This may be effected by the oil from the slide 74 being first caused to shift the thermostats 58 for the desired temperature.

While one more or less specific embodiment of the invention has been shown, it is to be understood that this is for purpose of illustration only, and that the invention is not to be limited thereby, but its scope is to be determined by the appended claims.

What we claim is:

1. In a continuous gas turbine system, at least two turbines connected for parallel operation at full load with respect to flow of motive fluid admitted thereto and mechanically independent of each other with respect to speed of operation, one of said turbines providing net useful power output from the system and the other of said turbines driving a compressor for compressing a fluid constituent of the motive fluid for operating the turbines of the system, means for heating the fluid compressed in said compressor before expansion thereof as motive fluid in the system, a first control means for regulating said heating means and a second control means operative to reduce the power output of the system by increasing the resistance to flow of the motive fluid to the compressor turbine as compared with the resistance of such flow to the useful power turbine, said second control means including a mechanism responsive to the pressure of fluid compressed in the system for maintaining the said second control means in an operative position for producing a selective value of partial load.

2. In a continuous gas turbine system, at least two turbines connected for parallel operation at full load with respect to flow of motive fluid admitted thereto and independent of each other with respect to speed of operation, one of said turbines providing net useful power output from the system and the other of said turbines driving a compressor for compressing a fluid constituent of the motive fluid for operating the turbines of the system, means for heating the fluid compressed in said compressor before expansion thereof as motive fluid in the system, a first control means for regulating said heating means and a second control means operative to reduce the power output of the system by increasing the resistance to flow of the motive fluid to the compressor turbine as compared with the resistance of such flow to the useful power turbine, said second control means including a device for setting the said second control means to a position appropriate for a given value of partial load operation and mechanism responsive to the pressure of fluid compressed in the system and coacting with said device to maintain operation of the system at the said given value of partial load.

3. In a continuous combustion gas turbine system having at least two expansion stages effected in mechanically independent turbines, at least two turbines connected for parallel operation at full load with respect to flow of motive fluid exhausted from a higher pressure expansion stage and mechanically independent of each other with respect to speed of operation, one of said parallel connected turbines providing net useful power output from the system and the other of said parallel connected turbines driving a compressor for compressing a fluid constituent of the motive fluid for operating the turbines of the system, a first heating means for heating the fluid compressed in said compressor before expansion thereof as motive fluid in the system, a second heating means for heating motive fluid exhausted from said higher pressure expansion stage, a first control means including temperature sensitive devices responsive to the temperature of the motive fluid delivered respectively by said first and second heating means for maintaining substantially constant inlet temperature of motive fluid admitted to both the lower and higher pressure stages independently of variations in load and a second control means operative to reduce the power output of the system by increasing the resistance to flow of the motive fluid from said higher pressure stage to the compressor turbine in parallel with the useful power turbine as compared with the resistance to such flow of the useful power turbine at full load, said second control means further being operative to control the quantity of fluid inducted into the system for compression therein at partial load.

4. In a continuous combustion gas turbine system having at least two expansion stages effected in mechanically independent turbines, at least two turbines connected for parallel operation at full load with respect to flow of motive fluid exhausted from a higher pressure expansion stage and mechanically independent of each other with respect to speed of operation, one of said parallel connected turbines providing net useful power output from the system and the other of said parallel connected turbines driving a compressor for compressing a fluid constituent of the motive fluid for operating the turbines of the system, a first heating means for heating the fluid compressed in said compressor before expansion thereof as motive fluid in the system, a second heating means for heating motive fluid exhausted from said higher pressure expansion stage, a first control means for regulating both of said heating means, a compressor driven by one of said parallel connected turbines being serially connected with a compressor driven by another turbine of the system and a second control means responsive to a regulating impulse derived from the combined influence of the delivery pressures of each of the last mentioned compressors operative to reduce the power output of the system by increasing the resistance to flow of the motive fluid from said higher pressure stage to the compressor turbine in parallel with the useful power turbine as compared with the resistance to such flow to the useful power turbine at full load.

5. In a continuous combustion gas turbine system, at least two turbines mechanically independent of each other with respect to speed of operation and connected for flow of motive fluid therethrough in parallel, a third turbine mechanically independent of said two parallel connected turbines with respect to speed of operation, one of said parallel connected turbines delivering net output power from the system and the other driving a compressor for compressing a fluid constituent of the motive fluid for the system, said third turbine driving another compressor and said compressors being connected in series, means providing a first conduit including first heating means for heating fluid compressed in the system to provide motive fluid for said third turbine, means providing a second conduit including second heating means for reheating motive fluid exhausted from said third turbine and delivering the reheated motive fluid to said parallel connected turbines, said second conduit also having an exhaust outlet, valve means located in said second conduit for selectively controlling flow of motive fluid therein to cause the motive fluid to be delivered to said second heating means for reheating or to be exhausted through said exhaust outlet, means providing a by-pass conduit affording communication between said first heating means and the inlet of said useful power turbine and valve means for selectively opening and closing said by-pass conduit, whereby to enable said third turbine and said output power turbine to be selectively connected either in series or in parallel with respect to flow of motive fluid by appropriate selective setting of said valve means.

6. A system as defined in claim 5 in which said serially connected compressors comprise a low pressure compressor driven by one of said parallel connected turbines and a high pressure compressor driven by said third turbine.

7. A system as defined in claim 6 including valve means selectively operable to admit uncompressed fluid directly to the compressor driven by said third turbine for initial compression therein.

8. A system as defined in claim 5 including valve means for regulating the rate of flow of motive fluid to the one of said parallel connected turbines driving a compressor.

GUSTAV KARL WILLIAM BOESTAD.
TEODOR IMMANUEL LINDHAGEN.

REFERENCES CITED

The following references are of record in the file of this patent:

UNITED STATES PATENTS

| Number | Name | Date |
|---|---|---|
| 2,078,958 | Lysholm | May 4, 1937 |
| 2,095,991 | Lysholm | Oct. 19, 1937 |
| 2,219,994 | Jung | Oct. 29, 1940 |
| 2,245,954 | Anxionnaz | June 17, 1941 |
| 2,280,765 | Anxionnaz et al. | Apr. 21, 1942 |
| 2,365,616 | Zweifel | Dec. 19, 1944 |
| 2,371,889 | Hermitte | Mar. 20, 1945 |